United States Patent
McClintock et al.

(10) Patent No.: US 10,409,977 B2
(45) Date of Patent: Sep. 10, 2019

(54) CHAINED AUTHENTICATION USING IMAGE TRANSFORMS

(71) Applicant: Amazon Technologies, Inc., Seattle, WA (US)

(72) Inventors: Jon Arron McClintock, Seattle, WA (US); Darren Ernest Canavor, Redmond, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/730,560

(22) Filed: Oct. 11, 2017

(65) Prior Publication Data
US 2018/0032716 A1    Feb. 1, 2018

Related U.S. Application Data

(63) Continuation of application No. 14/490,497, filed on Sep. 18, 2014, now Pat. No. 9,792,424.

(51) Int. Cl.
*G06F 21/40*      (2013.01)
*G10H 1/00*      (2006.01)
(Continued)

(52) U.S. Cl.
CPC .............. *G06F 21/40* (2013.01); *G06F 21/64* (2013.01); *G10H 1/00* (2013.01);
(Continued)

(58) Field of Classification Search
CPC ............. H04L 63/105; H04L 29/06755; H04L 2209/38; G06F 21/40; G06F 21/64
See application file for complete search history.

(56) References Cited

U.S. PATENT DOCUMENTS 5,530,759 A  *   6/1996   Braudaway ........... G06T 1/0028
                                                             380/54
7,065,226 B1 *   6/2006   Anzai ................... G06T 1/0064
                                                             382/100
(Continued)

OTHER PUBLICATIONS

Hu et al. "Efficient Constructions for one-way Hash Chains", Springer link, pp. 423-441 https://link.springer.com/chapter/10.1007/11496137_29 (Year: 2005).*

(Continued)

*Primary Examiner* — Shanto Abedin
*Assistant Examiner* — Carlos M De Jesus Lassala
(74) *Attorney, Agent, or Firm* — Davis Wright Tremaine LLP

(57) ABSTRACT

A service receives a request from a user of a group of users to perform one or more operations requiring group authentication in order for the operations to be performed. In response, the service provides a first user of the group with an image seed and an ordering of the group of users. Each user of the group applies a transformation algorithm to the seed to create an authentication claim. The service receives this claim and determines, based at least in part on the ordering of the group of users, an ordered set of transformations, which are used to create a reference image file. If the received claim matches the reference image file, the service enables performance of the requested one or more operations.

21 Claims, 10 Drawing Sheets

(51) Int. Cl.
*H04L 29/06* (2006.01)
*G06F 21/64* (2013.01)

(52) U.S. Cl.
CPC . *H04L 29/06755* (2013.01); *G10H 2210/031* (2013.01); *G10H 2250/215* (2013.01); *H04L 2209/38* (2013.01)

(56) References Cited

U.S. PATENT DOCUMENTS

| | | | | |
|---|---|---|---|---|
| 8,528,071 | B1* | 9/2013 | Kwan | H04L 63/0876 726/14 |
| 2002/0146123 | A1* | 10/2002 | Tian | G06F 21/10 380/234 |
| 2004/0039834 | A1* | 2/2004 | Saunders | H04L 29/06 709/231 |
| 2006/0072378 | A1 | 4/2006 | Bruekers | |
| 2008/0072261 | A1* | 3/2008 | Ralston | G11B 27/034 725/62 |
| 2009/0036190 | A1* | 2/2009 | Brosnan | G07F 17/32 463/16 |
| 2010/0292556 | A1* | 11/2010 | Golden | A61B 5/7465 600/364 |
| 2010/0305729 | A1 | 12/2010 | Glitsch et al. | |
| 2011/0078729 | A1 | 3/2011 | LaJoie et al. | |
| 2014/0108590 | A1* | 4/2014 | Hunt | G06F 8/63 709/217 |
| 2015/0088967 | A1 | 3/2015 | Muttik | |

OTHER PUBLICATIONS

Saxena et al. "Applications of Pairings in GRID Security" IEEE, pp. 1-4 http://ieeexplore.ieee.org/abstract/document/1665230 (Year: 2006).*

Saxena et al., "Applications of Pairings in GRID Security", IEEE, 2006, http://citeseerx.ist.psu.edu/viewdoc/download; sessionid=3C169904CB6A6497F06B320C9FE72A03?doi=10.1.1.138.5547&rep=rep1&type=pdf, 4 pages.

Hu et al., "Efficient Constructions for One-Way Hash Chains," Springer-Verlag Berlin Heidelberg, 2005, http://download.springer.com/static/pdf/259/chp%253A10.1007%252F11496137_29.pdf?originUrl=http%3A%2F%2Flink.springer.com%2Fchapter%2F10.1007%2F11496137_29&token2=exp=1449840148~acl=%2Fstatic%2Fpdf%2F259%2Fchp%25253A10.1007%25252F11496137_29.p, pp. 423-441.

Silva, "An Overview of Cryptograhpic Hash Functions and Their Uses," SANS Institute 2003, https://www.sans.org/reading-room/whitepapers/vpns/overview-cryptographic-hash-functions-879, 13 pages.

Boyle, "Amazon patents a method for identity authentication that uses music as the key," retrieved Oct. 31, 2017, from https://www.geekwire.com/author/alanboyle/, 3 pages.

Wikipedia, "Close Encounters of the Third Kind," retrieved Nov. 1, 2017, from https://en.wikipedia.org/wiki/Close_Encounters_of_the_Third_Kind, 18 pages.

The Telegraph, "The scienced of Close Encounters: could we use music to talk to aliens?," retrieved Nov. 1, 2017, from http://www.telegraph.co.uk/films/0/science-close-encounters-third-kind-could-use-music-talk-aliens/, 5 pages.

* cited by examiner

CHAINED AUTHENTICATION USING IMAGE TRANSFORMS

CROSS-REFERENCE TO RELATED APPLICATION

This application is a continuation of U.S. patent application Ser. No. 14/490,497, filed Sep. 18, 2014, entitled "CHAINED AUTHENTICATION USING MUSICAL TRANSFORMS," the disclosure of which is incorporated herein by reference in its entirety.

BACKGROUND

Service providers often require users to provide user credentials in order to access one or more services provided by these service providers. These service providers may also enable users to utilize these credentials to authorize other users to perform certain actions within these one or more services. For instance, a user may provide a username and corresponding password to the service to enable the service to authenticate the user and/or enable the user to authorize other users to perform certain operations. However, in some instances, it may be necessary for various users to be authenticated in order to jointly be authenticated to access the service. Further, these various users may also be required to collectively authorize a particular action to be performed within the service.

BRIEF DESCRIPTION OF THE DRAWINGS

Various embodiments in accordance with the present disclosure will be described with reference to the drawings, in which.

DETAILED DESCRIPTION

Figure 1:
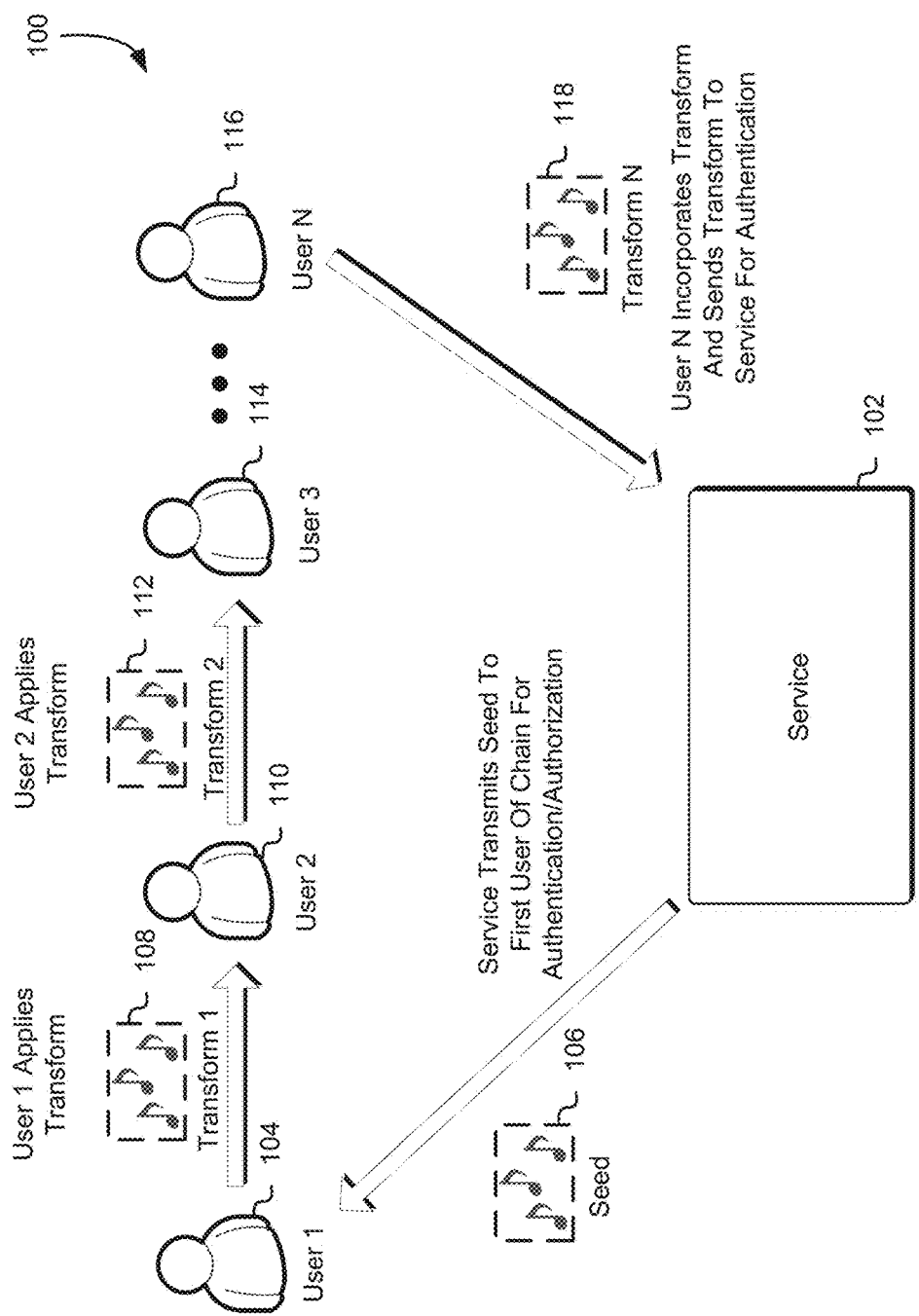
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use of musical transforms for chained authentication of one or more users of a group and for chained authorization to enable a particular action to be performed. In an embodiment, a service receives a request from an entity of a particular group to access the service or otherwise cause the service to perform one or more operations. To determine whether the entity is authorized to perform the action or can be authenticated to access the service, the service may transmit, to a first user of the group, a musical seed. This musical seed may be musical sample of a popular song, a unique musical composition created by the service, a garbled sound that, when successfully transformed, results in a clear, understandable sound, or any other audio signal. The entities of the particular group may be customers of the service, which may collectively access the service to perform one or more operations or authorize certain operations to be performed.

Each entity of the group may be assigned a particular musical transform algorithm, which may be used to transform a musical composition. For instance, the musical transform algorithm may change a musical sample by performing a modulation of the musical sample, moving the musical sample up or down an octave, or changing the tempo of the musical sample. Alternatively, the musical transform algorithm may enable each entity of the group to compose a musical sequence that may follow from the musical sample provided to the user either from the service or other entity of the group. When the service provides the musical seed to the first entity of the group, the first entity may apply its musical transform algorithm to the musical seed to create a modified musical sample. The first entity may then provide this modified musical sample to the next entity of the group, which may apply his/her own musical transform algorithm to the musical sample and transmit it to the next entity or to the service if the entity is the last of the group.

When the service receives the transformed musical sample from the last entity of the group, the service may access account information for each entity of the group to identify the musical transform algorithms used to generate this transformed musical sample. The service may utilize a mechanism based on these identified musical transform algorithms to determine if reversal of the transformation process results in the original musical seed provided to the first entity of the group. Alternatively, the service may apply the known musical transform algorithms for each of the entities of the group to the musical seed to determine if the service's transformation of the musical seed matches the received transformed musical sample from the last entity of the group. If there is a match, then the service authenticates these entities and/or authorizes the requested action that is to be performed.

In an embodiment, the musical seed may be a garbled sound sample that, when transformed correctly by each entity of the group, results in a clear or recognizable sound. Each entity of the group may be provided with a transformation algorithm that may be used to perform frequency modulation of the garbled sound sample to achieve a particular frequency. If performed correctly, the last entity, when he/she applies its own transformation algorithm, the garbled sound sample may be transformed into a sound sample that may be processed by the service and other entities as a clear musical composition or speech. Thus, if the sound sample received by the service is still garbled, then the service may determine that the entity is not authorized to perform the requested action or that the transformed musical seed cannot be used to authenticate the entity.

In this manner, a service utilizes musical transformations to determine whether an entity can be authenticated in order to access the service or are authorized to collectively perform a particular action within the service. In addition, the techniques described and suggested herein facilitate additional technical advantages. For example, because, in some embodiments, the service is able to utilize the musical transformation algorithms for each entity to determine whether the received transformed musical sample is correct for the group, the service may be able to identify which particular entity of the group did not apply the appropriate musical transform algorithm to achieve the correct transformed musical sample. This may enable the service or the other entities of the group to perform any corrective measures to address this discrepancy by the particular entity of the group.

FIG. 1 shows an illustrative example of an environment 100 in which various embodiments can be implemented. In the environment 100, a service 102 may receive a request from a user of a group of users to access the service 102 and/or perform one or more operations that require authorization from the all users of the group of users in order to be performed. Each user of the group of users may be customers of the service 102, whereby each user may utilize one or more sets of credentials to access the service 102 and perform one or more operations. Further, each user of the group of users may be required to provide its authorization for a particular action to be performed. For instance, the service 102 may include one or more policies that may specify that a group of users are required to provide authorization for a user of the group to perform a specified action. Thus, if the service 102 receives a request from a user to perform such an action, the service 102 may require authorization from the group of users to enable the action to be performed.

In an embodiment, the service 102 provides each user of a particular group a specific musical transformation algorithm which may be used to specify the user's authorization for an action to be performed or to enable the service 102 to authenticate these users. If the service 102 receives a request from a user to perform a particular action or for the group to collectively access the service 102, the service 102 may transmit a musical seed 106 to a first user 104 (e.g., User 1, as illustrated in FIG. 1) to initiate the authorization/authentication process and enable creation of an authentication claim usable to authenticate the group of users. The musical seed 106 may include a sample of a popular song, which may be modified by the one or more users of the group of users to authorize the action to be performed or to enable the service 102 to authenticate the group of users. Alternatively, the musical seed 106 may include a garbled sound composition, which may require one or more frequency modulations in order to produce an understandable, clear sound that may be processed by the service 102. Each transform algorithm assigned to each user of the group of users may cause the musical seed 106 to be modified. While musical seeds 106 are used extensively throughout the present disclosure for the purpose of illustration, other media may be used as a seed. For instance, as will be demonstrated below in connection with FIG. 5, the seed 106 may include an image, which users of the group may modify through use of filters and supplemental image processing algorithms to provide its authentication/authorization credentials. Additionally, in some embodiments, the transformation of the musical seed 106 may be performed by the users themselves, without the aid of computing systems. For instance, a user may utilize one or more musical instruments or vocal intonations to perform and record the transformations.

In some embodiments, the algorithms provided to each user may be rotated or automatically revoked after a particular period of time or in response to a triggering event. For instance, after a period of time, the service 102 may transmit a new algorithm to each user of the group, which is to be used for any successive seeds 106 transmitted to these users. Alternatively, the algorithm provided to each of these users may expire after this particular period of time. In another instance, the service 102 may revoke the one or more algorithms in response to a data breach affecting the one or more users of the group, such that the one or more algorithms may be compromised.

The service 102 may specify, in the musical seed 106, metadata of a file that encodes the seed 106 or in another file transmitted to the first user 104 with the seed 106, which other users of the group of users will be required to transform the musical seed 106 prior to delivery to the service 102. This may include a particular order in which the musical seed 106, once transformed by the first user 104, is to be provided to other users of the group of users for transformation. In an alternative embodiment, the transformation of the musical seed 106 may not require a particular order in which the seed 106 needs to be transformed for an authentication/authorization claim. For instance, the musical seed 106 may be provided to any of the users of the group for a first transformation and, subsequently, to any of the other users of the group in any order, so long as each user of the group has had an opportunity to utilize its transformation algorithm to modify the musical seed 106.

When the first user 104 receives the musical seed 106 from the service 102, the first user 104 may, through one or more computer systems, apply his/her assigned musical transformation algorithm to the musical seed 106 to generate a first transformed musical sample 108. This transformed musical sample 108 may be a frequency modulation of the original musical seed 106. Alternatively, or additionally, the transformed musical sample 108 may further include a transformation of the musical seed 106 by changing each musical note by an octave, or changing the tempo of the musical seed 106. In an alternative embodiment, the first user 104 supplements the received musical seed 106 with a unique note progression that may follow based at least in part on the note progression included within the musical seed 106. For instance, the particular algorithm provided to the first user 104 by the service 102 may utilize a note progression as input and, based at least in part on one or more mathematical and musical calculations included in the algorithm, develop a new note progression that may follow the musical composition in the seed 106.

Once the first user 104 has applied his/her transformation algorithm to the musical seed 106 to create a transformed musical sample 108, the first user 104 may transmit this transformed musical sample 108 to a second user 110, which may utilize his/her transformation algorithm to generate a new transformed musical sample 112 that incorporates the changes made by the first user 104 and the changes made by this second user 110 within the group. This second user 110 may not be aware of the changes made to the musical seed 106 by the first user 104, preventing this second user 110 from being able to identify the transformation algorithm utilized by this first user 104 to generate the transformed musical sample 108 provided to the second user 110 of the group. The second user 110 may provide the transformed musical sample 112 to a third user 114, continuing the transformation of the musical seed 106 until it reaches the final user 116 of the group.

The final user 116 of the group may utilize his/her transformation algorithm to generate a final transformed musical sample 118, which may include the musical seed 106 as transformed utilizing the transformation algorithm of each user of the group. Thus, this final transformed musical sample 118 may be quite dissimilar from the original musical seed 106 provided to the first user 104 of the group. In an embodiment, if the seed 106 was originally a garbled sound file, this final transformed musical sample 118, if the transformation algorithms applied by each user of the group does correspond to the algorithms provided to these users by the service 102, may include a clear, understandable sound file that may be used to authenticate/authorize each user of the group. The final user 116 of the group may provide this final transformed musical sample 118 to the service 102, which may process this sample 118 to determine if the users of the group of users can be authenticated and permitted to access the service 102 and/or authorized to perform a particular action.

While users are used extensively throughout the present disclosure for the purpose of illustration, other entities may be involved in the authentication/authorization process to authenticate an entity or authorize an entity to perform one or more actions. Further, while multiple users are illustrated in FIG. 1, in some embodiments, the authentication/authorization process may include a single entity interacting with the service 102. For instance, in an embodiment, the service 102 transmits the seed 106 to a mobile device owned by a user 104. The mobile device may be configured to utilize its transformation algorithm to transform the musical seed 106 and provide the transformed musical seed 108 to the service 102 or other device/user of the group for further transformation. In an embodiment, the service 102 and group of users can be involved in a multi-factor authentication (MFA) scheme, whereby the service 102 and the group of users may be authenticated. For instance, the service 102 may transmit the musical seed 106 to a user 104 or a device associated with the user 104. The user 104 applies his/her transformation algorithm to the seed to create a transformed musical seed 108, which is then transmitted to the service 102. Upon receiving the transformed musical seed 108, the service 102 may verify that the transformation was performed correctly by the user 104 and, if so, applies its own transformation algorithm to the seed 108. This transformed seed is sent to the user 104 again, which may determine whether the service 102 has performed the transformation correctly. This may enable the service 102 and user 104 to be authenticated.

To determine if the group of users is authorized to perform the requested operation or can be authenticated to enable access to the service 102, the service 102 may analyze the final transformed musical sample 118 to determine if the transformation algorithms for each user of the group were applied correctly to create the expected final musical sample. For instance, the service 102 may access accounts for each of the users of the group and identify, for each user, the particular algorithm assigned to the user. The service 102 may utilize these obtained transformation algorithms to perform its own transformation of the musical seed 106 and determine whether the received final transformed musical sample 118 from the final user 116 of the group corresponds to the service's 102 transformed musical sample. If the two transformed musical samples do not match, the service 102 may deem an authentication/authorization failure as the group of users has not been able to produce the expected transformed musical sample.

If the service 102 determines that there has been an authentication/authorization failure on the part of the group of users, the service 102 may utilize the obtained transformation algorithms from the user accounts of each user of the group to identify which one or more users of the group did not utilize the correct transformation algorithm to obtain the proper transformed musical sample. Once the service 102 has been able to identify the one or more users of the group, the service 102 may perform one or more security measures. For instance, the service 102 may notify an administrator of the group of users to specify that one or more users of the group may need to be investigated further due to the failure in the authentication/authorization process. Additionally, or alternatively, the service 102 may simply deny any further requests stemming from this group of users until the issue is resolved. Alternatively, if the received final transformed musical sample 118 from the final user 116 does correspond to the expected transformed musical sample calculated by the service 102, the service 102 may enable the group of users to perform the requested action and/or access the service 102.

In some embodiments, the service 102 may store the authentication claim and other transformed musical samples 118 from the group of users in an audit record. The audit record may specify the one or more users of the group of users that participated in transforming the musical seed 106 to generate the authentication claim. The audit record may enable the service 102 to identify valid and invalid authentication claims received over time and determine areas of improvement or corrective action to improve the authentication/authorization processes. For instance, if an authentication claim is deemed to be invalid, the service 102 may store this invalid claim within the audit record. At a later time, the service 102 may evaluate the audit record to identify where the authentication claim may have failed through the chain of users and perform any security measures to mitigate future failures.

Figure 2:
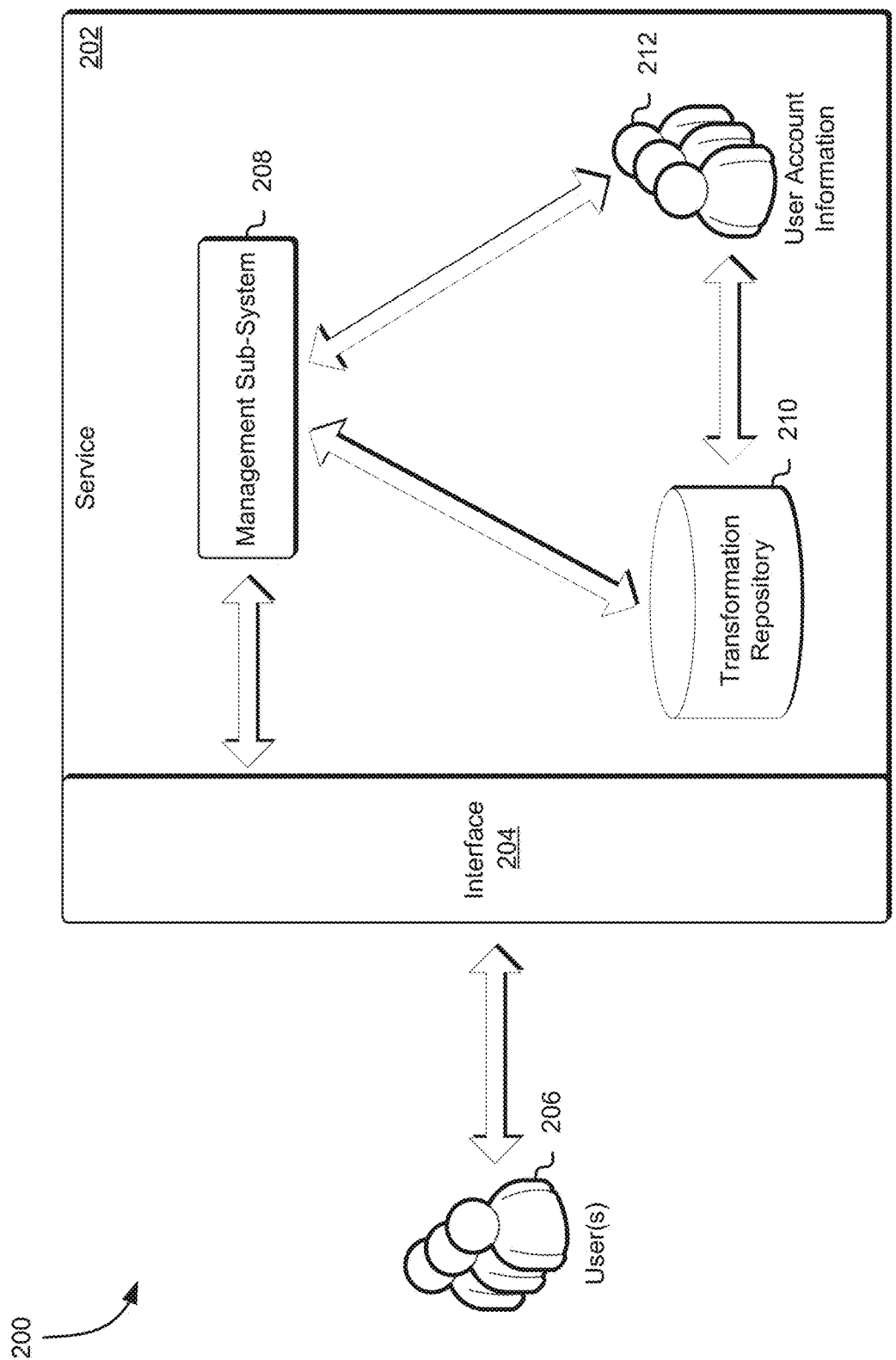
FIG. 2 shows an illustrative example of an environment in which various components of a service may be collectively configured to enable users of the service to be authorized to perform one or more operations or be authenticated in accordance with at least one embodiment.

As noted above, a service may provide each user of a group of users with a transformation algorithm, which may be used by each user to transform a musical seed into a musical sample that may be used to authenticate/authorize the group of users. Accordingly, FIG. 2 shows an illustrative example of an environment 200 in which various components of a service may be collectively configured to enable users of the service to be authorized to perform one or more operations or be authenticated in accordance with at least one embodiment. In the environment 200, a user of a group of users 206 may transmit one or more requests to a service 202 through an interface 204. The interface 204 may include a graphical user interface, which may enable a user of a group of users 206 to provide the one or more requests to the service 202. The user may utilize the interface 204 to request access to the service 202. Alternatively, or additionally, the user may utilize the interface 204 to request performance of one or more operations. For example, a user of a group of users 206 may submit a request to purchase an item from the service 202 utilizing a payment account associated with the group of users 206. Each user of the group of users 206 may be required to authorize this payment before the purchase may be processed.

Prior to receiving the request, an administrator of the group of users 206 may specify, through the interface 204, one or more users that are to be included in the group of users 206. In order for a user of the group of users 206 to access the service 202 and/or perform one or more operations, the entire group of users 206 may be required to be authenticated by the service 202 and provide its authorization to enable the user to perform the requested action. The management sub-system 208 may receive, through the interface 204, this request from the administrator to include these one or more users to the group of users 206. Accordingly, the management sub-system 208 may access a user account information data store 212 and create one or more accounts for each of the specified one or more users. Further, the management sub-system 208 may specify, within each user account, that the user is a member of the group of users 206.

The management sub-system 208 may subsequently access a transformation repository 210 and assign a particular transformation algorithm to each user of the group of users 206. The management sub-system 208, through the interface 204, may provide these assigned transformation algorithms to the users of the group of users 206 for authentication/authorization purposes. Further, the management sub-system 208 may again access the user account information data store 212 and specify, within each user account, the transformation algorithm assigned to the user.

In response to receiving the one or more requests from a user of the group of users 206, the interface 204 may transmit the one or more requests from a user of the group of users 206 to a management sub-system 208, which may be configured to generate a musical seed that may be used for authenticating/authorizing the group of users 206 to perform the requested action and/or access the service 202. Additionally, the management sub-system 208 may access a user account information data store 212 to identify the group of users 206 that the user submitting the request belongs to. For instance, the user account corresponding to the user may specify an identifier of the group of users 206. The management sub-system 208 may utilize this group identifier to identify all other users of that group 206. Further, when the management sub-system 208 generates the musical seed to be used for authentication/authorization, the management sub-system 208 may specify, in metadata or a separate data file included with the musical seed, an ordering of the users of the group of users 206 for which the transformation of the musical seed is to be performed.

Once the management sub-system 208 has determined the ordering for the group of users 206 and has generated the musical seed, the management sub-system 208, through the interface 204, may transmit the musical seed to the first identified user of the group of users 206. As noted above, each user of the group of users 206 may utilize their individual transformation algorithm to transform the musical seed and provide the transformed musical seed to the next user of the group of users 206. When the transformed musical seed is received by the final user of the group of users 206, the final user may apply his/her transformation algorithm to the musical seed to generate the final transformed musical sample. This sample may be provided to the service 202, through the interface 204 for analysis.

When the management sub-system 208, through the interface 204, receives the transformed musical sample from the final user of the group of users 206, the management sub-system 208 may determine whether the received sample corresponds to an expected transformation of the musical seed. For instance, in an embodiment, the management sub-system 208 obtains, from the user account information data store 212, an ordering of the transformation algorithms corresponding to each user of the group of users 206. Based at least in part on this ordering of transformation algorithms, the management sub-system 208 may access a transformation repository 210 to obtain the transformation algorithms specified in this ordering of transformation algorithms. This may enable the management sub-system 208 to apply these transformation algorithms to the musical seed and generate an encoding of a reference audio signal.

Upon generating an encoding of the reference audio signal, the management sub-system 208 may compare this encoding of the reference audio signal to the musical sample received from the group of users 206 through the interface 204. If the reference audio signal and the transformed musical sample from the group of users 206 match, the management sub-system 208 may enable the group of users 206 to access the service 202 and enable the user of the group of users 206 that submitted the request to perform the requested action. However, if the transformed musical samples do not match, the management sub-system 208 may deny the request from the user of the group of users 206 and perform one or more additional security measures to address this potential issue. For instance, the management sub-system 208 may determine, based at least in part on the transformation algorithms assigned to each user of the group of users 206, which one or more users of the group of users 206 have utilized an anomalous transformation algorithm, resulting in the sample mismatch. The management sub-system 208, through the interface 204, may notify an administrator of the group of users 206 to specify which users may be compromised and enable the administrator to perform any security measures within the group of users 206.

Figure 3:
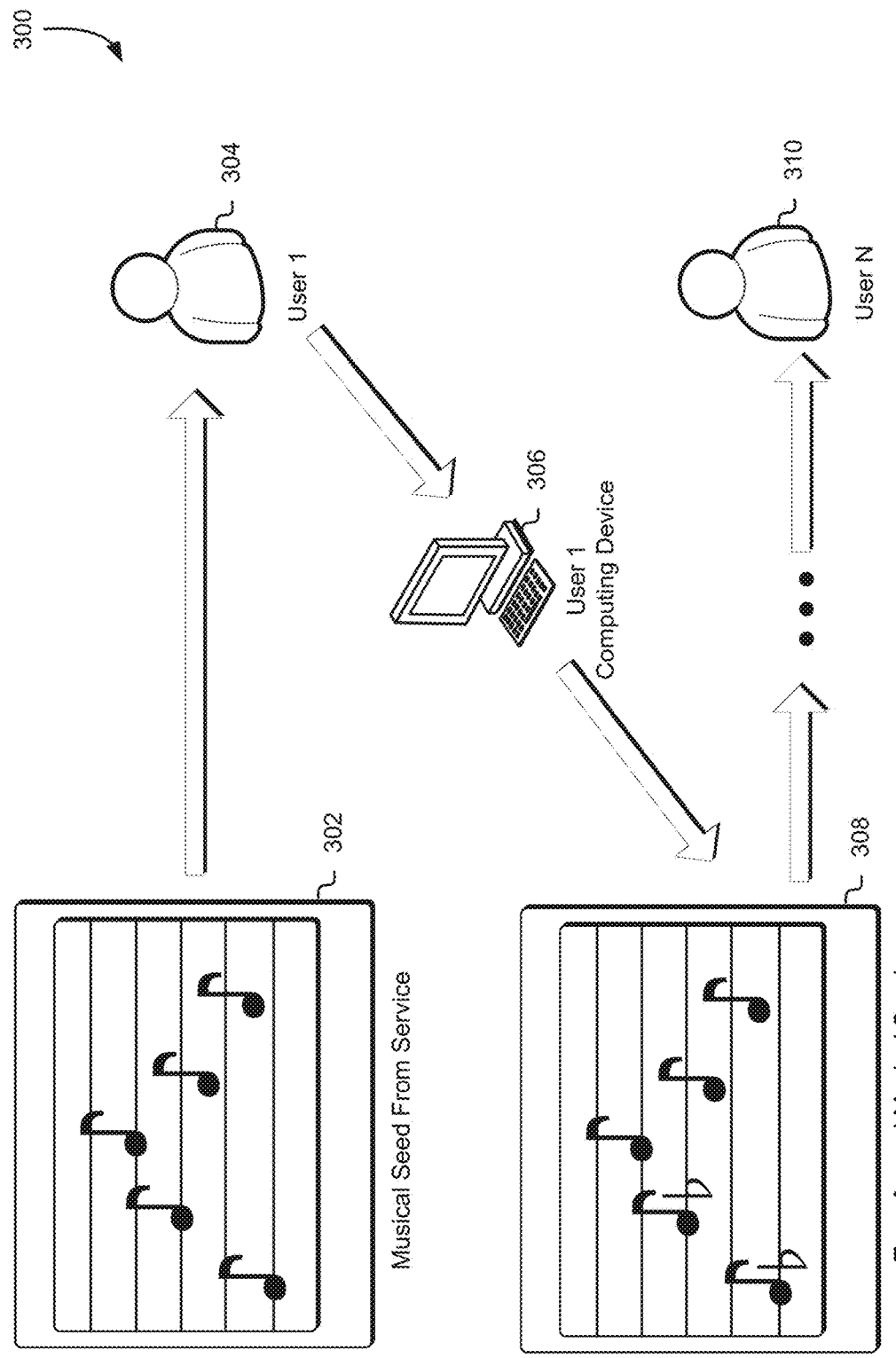
FIG. 3 shows an illustrative example of an environment in which a musical seed from a service is transformed and provided to a next user in the chain of authentication in accordance with at least one embodiment.

As noted above, a service may transmit a musical seed to a first user of a group of users to initiate authentication of the group of users for accessing the service or authorization to perform one or more operations requiring group approval. Each user of the group of users may utilize a personal transformation algorithm, provided by the service, to transform the musical seed and produce a transformed musical seed that may be used for authentication/authorization. Accordingly, FIG. 3 shows an illustrative example of an environment in 300 which a musical seed from a service is transformed and provided to a next user in the chain of authentication in accordance with at least one embodiment.

In the environment 300, a service provides a musical seed 302 to a first user 304 to initiate an authentication/authorization process. For instance, a user of the group of users may submit a request to the service to enable the group of users to access the service. Additionally, or alternatively, a user of the group of users may submit a request to perform one or more operations requiring the authorization of the entire group to enable performance of these operations. The service, in response to the request, may generate the musical seed 302 and identify an ordering of users of the group of users for transmitting the musical seed 302 to these users in an appropriate order. In some embodiments, an ordering is not required so long as the musical seed 302 is transformed by a particular subset of the group of users. The musical seed 302 may include a sample of a popular song, a randomly generated musical composition, or an ordered set of musical notes arranged in a particular manner by the service.

When the service provides the musical seed 302 to the first user 304 of the group of users, the first user 304 may utilize his/her computing device 306 (e.g., computer system, mobile device, etc.) to transform the musical seed 302 to a transformed musical seed 308. The computing device 306 may include one or more transformation algorithms, provided by the service, which may be used to transform this musical seed 302 according to service specifications. As illustrated in FIG. 3, the computing device 306 may utilize the one or more transformation algorithms from the service to transform the musical seed 302 by changing the scale of the musical seed 302 to a G-minor scale. While scale changes, such as the G-minor scale transformation described herein, are used extensively throughout the present disclosure for the purpose of illustration, other transformations may be performed using the transformation algorithms provided to the first user 304 by the service. For instance, the computing device 306, utilizing the transformation algorithms from the service, may transform the musical seed 302 by changing the tempo of the seed, raising or lowering the musical seed 302 by an octave, or supplementing the musical seed 302 with a progression of notes that may calculated using the transformation algorithm through an analysis of all notes in the original musical seed 302.

Once the computing device 306 for the first user 304 has utilized its transformation algorithm to generate the transformed musical seed 308, the computing device 306 may transmit this transformed musical seed 308 to the next user of the group of users. This may enable these next users of the group of users to utilize their own transformation algorithms to further modify the transformed musical seed 308. When the transformed musical seed 308 reaches the final user 310 of the group of users, the final user 310 may utilize his/her assigned transformation algorithm, through his/her computing device, to perform one final transformation of the transformed musical seed 308 and provide the transformed musical seed 308 to the service as an authentication/authorization claim.

When the service receives the transformed musical seed 308 from the final user 310 of the group, the service may identify the transformation algorithms assigned to each user 304, 310 of the group and apply these algorithms to the musical seed 302 to obtain its own transformed musical seed. The service may compare its own transformed musical seed to the transformed musical seed 308 obtained from the final user 310 of the group to determine if they match. If there is a match, the service may be able to authenticate the users of the group and enable them to access the service. Further, if the request to the service was from a user to perform a particular action, the service may deem the user to be authorized based at least in part on each user's authorization.

Alternatively, if there is no match, the service may determine that the group of users cannot be authenticated and thereby deny all users of the group access to the service. Further, a user submitting the request to perform a particular action may be deemed to not be authorized to perform the action. Thus, the service may deny the user's request to perform the action. In addition to denial of service or performance of a specified action, the service may utilize the assigned transformation algorithms and the original musical seed 302 to determine which user 304, 310 of the group of users is responsible for the failure in the authentication/authorization claim. This may enable the service to specify, to an administrator of the group, which users may be compromised and enable the administrator to perform one or more security measures to address the issue.

Figure 4:
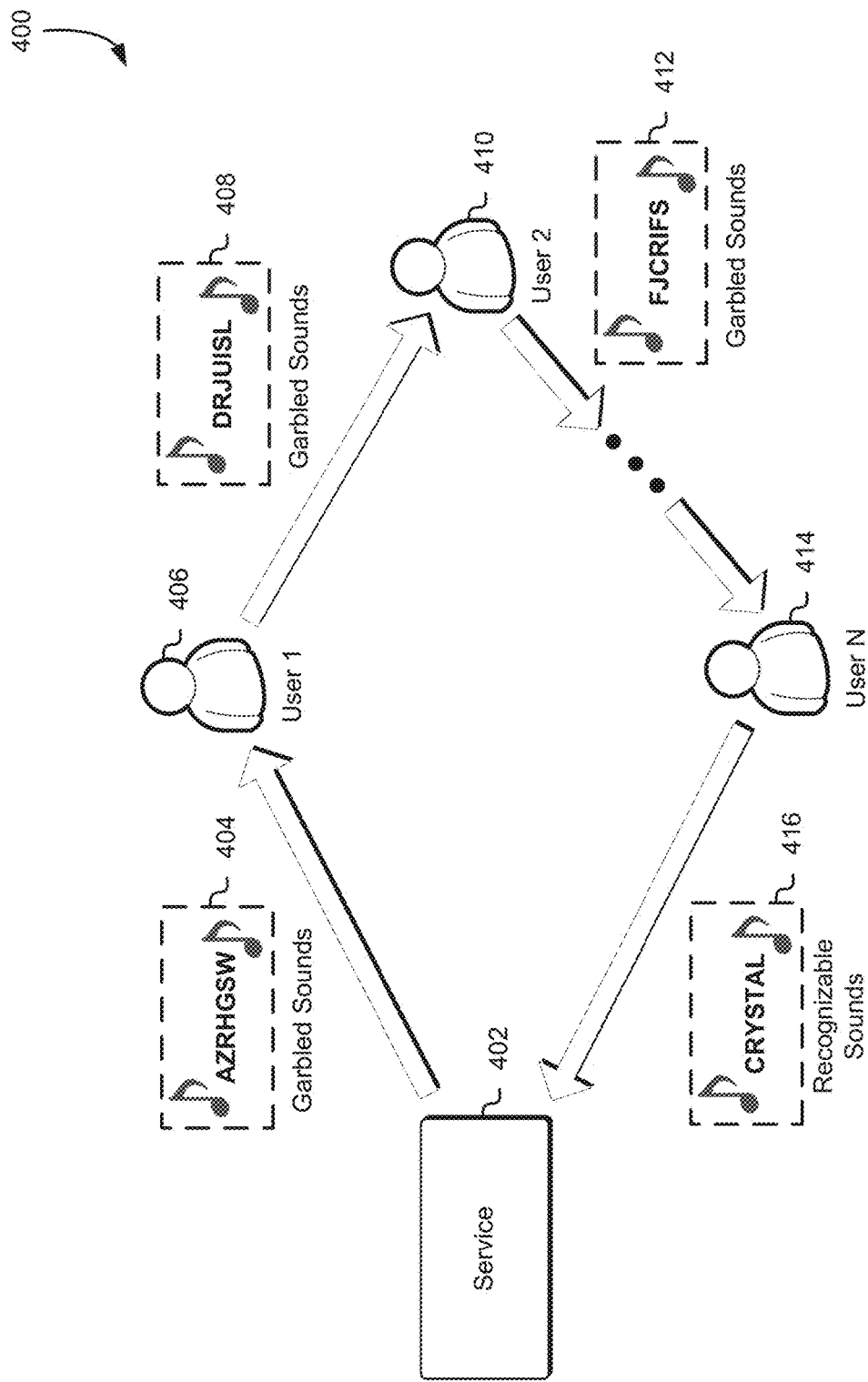
FIG. 4 shows an illustrative example of an environment in which a service provides users in a chain with a garbled sound seed which may be transformed into a clear sound in accordance with at least one embodiment.

As noted above, a service may provide a group of users with a garbled sound sample, which may enable the group of users to apply one or more transformation algorithms to obtain a clear, understandable sound that may be used to authenticate the group of users or authorize a user of the group of users to perform a requested action. Accordingly, FIG. 4 shows an illustrative example of an environment 400 in which a service 402 provides users in a chain of users with a garbled sound seed 404 which may be transformed into a clear sound 416 in accordance with at least one embodiment. In the environment 400, a service 402 may generate a garbled sound 404 that, when transformed correctly, may produce a recognizable sound 416 that may be used to authenticate a group of users or authorize a user of the group of users to perform a particular action. Each user of the group of users may be provided with a transformation algorithm, which may be used to transform the garbled sound seed 404.

When the service 402 receives a request from a user of the group of users to perform a particular action or receives a request to enable the group of users to access the service 402, the service 402 may generate the garbled sound seed 404. In order to generate the garbled sound seed 404, the service 402 may identify the one or more users of the group of users and the transformation algorithms assigned to each user of the group of users. The service 402 may determine an ordering for this group of users in which the garbled sound seed 404 is to be provided to these users for transformation. Alternatively, an ordering may not be required if the transformations are commutative. Further, the service 402 may utilize the transformation algorithms for each user of the group of users to calculate the transformations required to convert a clear sound to the garbled sound seed 404 in a manner that, when the transformation algorithms are applied correctly, the garbled sound seed 404 may be converted to a recognizable sound 416.

Once the service 402 has generated the garbled sound seed 404 for authentication/authorization, the service 402 may provide the garbled sound seed 404 to a first user 406 of the group of users. The first user 406 may identify the assigned transformation algorithm that corresponds to this particular group of user and utilize this transformation algorithm to transform the garbled sound seed 404 to create a second garbled sound seed 408. For instance, the garbled sound seed 404 from the service 402 may specify, in metadata or in a separate data file transmitted to the first user 406, a group identifier which may be used to identify the members of the particular group. Additionally, the metadata or separate data file may specify an ordering in which the garbled sound seed 404 is to be provided to the users of the group. This may enable the first user 406 to identify the second user 410 of the group that is to be provided with the transformed sound seed 408 from the first user 406. The first user 406 may apply its transformation algorithm to the garbled sound seed 404 to create the transformed sound seed 408. The transformation algorithm may modify the garbled sound seed 404 by performing a frequency modulation that may transform the garbled sound seed 404 into a new frequency.

As with the first user 406, the second user 410 of the group may apply his/her own transformation algorithm to the transformed sound seed 408 obtained from the first user 406 to generate a new transformed sound seed 412. This may enable the garbled sound seed 404 to continuously be transformed until it reaches the final user 414 (e.g., User N) of the group of the users. This final user 414 may apply his/her transformation algorithm to the latest, transformed sound seed to generate the recognizable sound seed 416. In order to prevent manipulation of the transformed sound seed to spoof the transformation algorithm, the final user 414 may only be authorized to utilize his/her transformation algorithm and perform no other operations affecting the transformed sound seed received from other users of the group of users.

Once the final user 414 has utilized his/her transformation algorithm to further transform the garbled sound seed 404, the final user 414 may transmit the transformed sound seed 416 to the service 402 for analysis. If the received transformed sound seed 416 produces a recognizable sound that can be recognized by the service 402, the service 402 may determine that the group of users can be authenticated and thus may access the service 402. Alternatively, or additionally, the service 402 may deem the user of the group of users attempting to perform one or more operations using the service 402 to be authorized to perform the requested one or more operations. However, if the transformed sound seed 416 received from the final user 414 is still garbled and, thus, not recognizable by the service 402, the service 402 may deny the request from the user of the group of users and/or deny the group of users access to the service 402.

Figure 5:
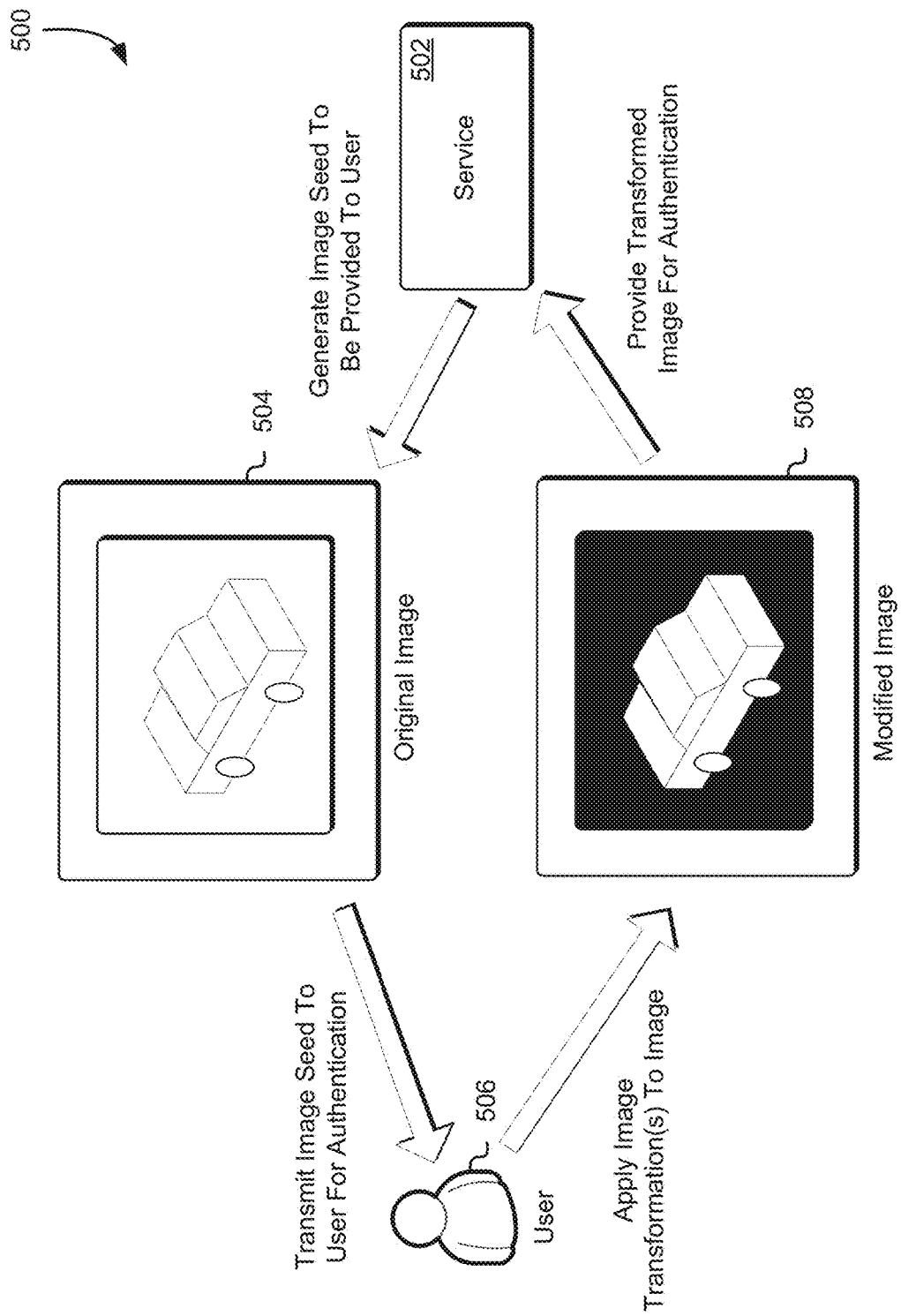
FIG. 5 shows an illustrative example of an environment in which an image is transformed using one or more image filters and other methods for authentication in accordance with at least one embodiment.

As noted above, in addition or as an alternative to utilizing audio transmissions and transformations to determine whether a group of users may be authenticated and granted to access a service or whether a user of the group of users is authorized to perform a particular action, a service may utilize visual transformations of static or dynamic images (e.g., video) to perform such authorization/authentication processes. Accordingly, FIG. 5 shows an illustrative example of an environment 500 in which an image 504 is transformed using one or more image filters and other methods for authentication and authorization in accordance with at least one embodiment. In the environment 500, a service 502 receives a request from a user 506 to perform one or more operations and/or to access the service 502. The user 506 may be a member of a group of users that may require the authorization of a subset of the group of users to enable the user 506 to perform one or more operations. Alternatively, or additionally, the subset of the group of users may need to be authenticated by the service 502 in order to enable access to the service 502 for this subset of the group of users.

Each user 506 of the group of users may be provided, by the service 502, with a particular image processing algorithm, which may be used to modify an image from the service 502 in a particular manner. This may enable the service 502 to verify the identity of the user 506 and enable the user 506 to perform one or more requested operations. For instance, when the user 506 submits a request to the service 502 to access the service 502 and/or perform one or more operations, the service 502 may generate an image seed 504, which may comprise an image generated or obtained by the service 502 for use in authenticating/authorizing the user 506. The service 502 may further identify the one or more image processing algorithms assigned to the user 506 and any other member of the group of users to determine a transformed image that may be used to verify that the identity of the group of users is authenticated and/or that the user 506 is authorized to perform the requested one or more operations.

When the user 506 receives the original image seed 504 from the service 502, the user 506 may utilize his/her image processing algorithm to generate a modified image 508. For instance, the image processing algorithm may modify the color hue/saturation of the original image 504, remove elements of the image 504, supplement the image 504 with one or more objects or designs, insert a unique watermark into the image 504, and the like. Once the user 506 has utilized his/her particular image processing algorithm to modify the original image 504 from the service 502, the user 506 may transmit this modified image 508 to another user of the group for further transformation, if required, or transmit the modified image 508 to the service 502 for processing.

Once the service 502 receives the modified image 508 from the user 506 or a different final user of the group of users, the service 502 may compare this modified image 508 to the expected transformed image the service 502 has generated using the identified image processing algorithms for the user 506 and any other required user of the group. If the service 502 determines that the received modified image 508 matches the expected transformed image generated by the service 502, the service 502 may enable the user 506 to access the service 502 and/or perform the one or more requested operations. Alternatively, if the images do not match, the service 502 may instead deny the user's 506 request and perform any security measures to address the potential issue.

Figure 6:
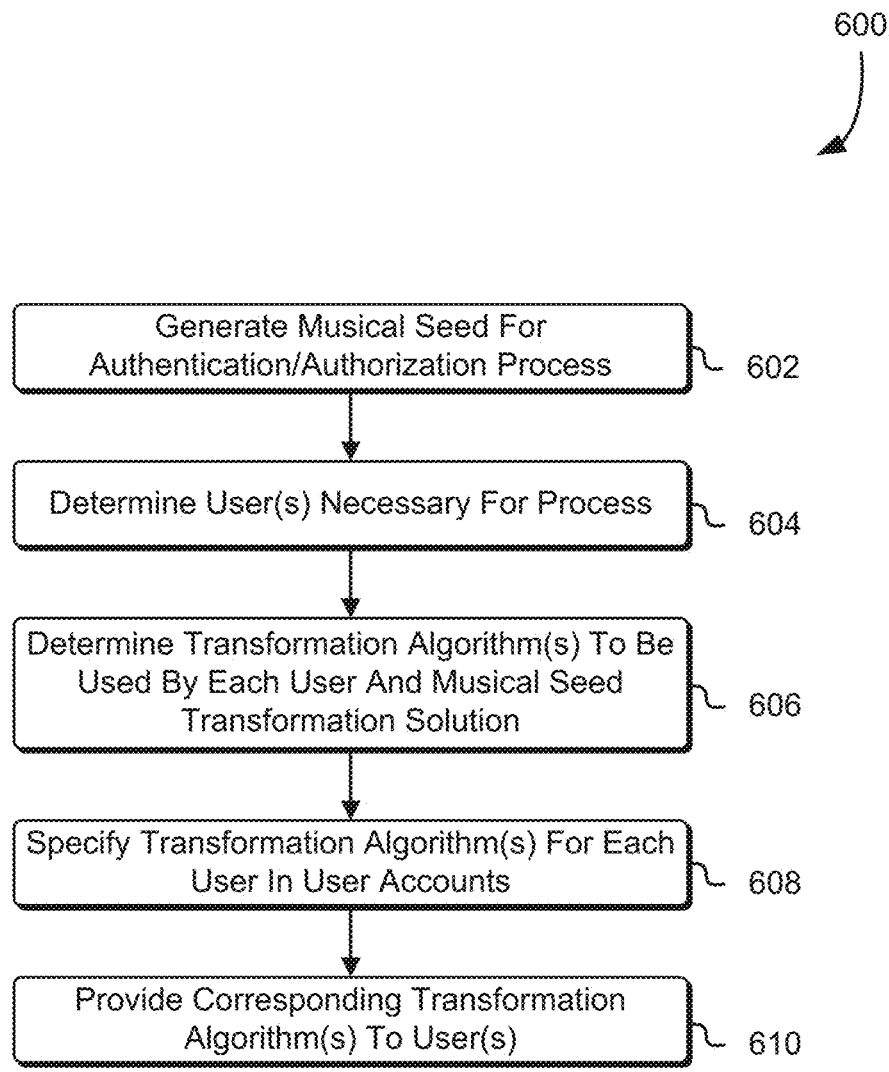
FIG. 6 shows an illustrative example of a process for providing one or more users in an authentication/authorization chain with certain transformation algorithms for authentication/authorization in accordance with at least one embodiment.

As noted above, a service may provide a user of a group of users with a musical seed, which may be transformed by one or more users of the group of users to authorize a user to perform one or more operations and/or access the service. In order for the musical seed to be transformed, each user of the group of users may need to be provided with unique musical transformation algorithms that may be unique to the user and usable to transform a musical seed to ultimately generate an authentication/authorization claim. Accordingly, FIG. 6 shows an illustrative example of a process 600 for providing one or more users in an authentication/authorization chain with certain transformation algorithms for authentication/authorization in accordance with at least one embodiment. The process 600 may be performed by any service that may require a group of users to provide uniform authentication/authorization information to enable any user of the group to perform one or more operations on behalf of the group of users and/or access the service.

At any point, a service may receive a request, from an administrator of a group of users, to create an account for each user of the group of users. The administrator may specify that in order for a member of the group to be authorized to perform one or more operations, a certain subset of users of the group of users may be required to provide their collective authorization to the user. Additionally, this subset of users of the group of users may be required to be authenticated prior to being able to access the service. In order for the service to enable this group of users to collectively authorize a user of the group to perform one or more operations or to be granted access to the service, the service may generate 602 a musical seed for these authentication/authorization processes. For instance, the musical seed may be obtained through sampling a portion of a particular popular musical composition. Alternatively, the service may utilize one or more musical genetic algorithms to create a unique musical sample that may be used as the musical seed for this group of users.

Once the service has generated a musical seed that is to be used for the authentication/authorization processes of the group of users, the service may determine 604 a subset of users of the group users that are necessary for successful performance of these processes. For instance, the administrator of the group of users may specify that only particular users of the group of users are required to be involved with the authentication/authorization processes. Alternatively, the service may be configured to select this subset of users of the group of users at random based at least in part on an ordering of users provided by the administrator. The service, upon determining this subset of users of the group of users may specify, within user accounts for each of these users, that these particular users will be involved in future authorization/authentication processes as required.

Based at least in part on the subset of users of the group of users selected for future authentication/authorization processes, the service may determine 606 one or more transformation algorithms that are to be used by each of these users and the particular musical seed transformation solution. For instance, the service may select, from a transformation repository comprising a plurality of different transformation algorithms, one or more transformation algorithms that may be used to transform the musical seed and generate a desired transformation solution. For example, if the musical seed includes one or more garbled sounds that, when transformed, are recognizable, the service may select one or more transformation algorithms that, when utilized to transform the musical seed, may produce these recognizable sounds.

Once the service has determined the particular set of transformation algorithms that are to be used by these users of the group to generate an authentication/authorization claim and obtain the desired transformation solution, the service may specify 608, within each user account of these selected users, the one or more transformation algorithms that may be used by the user to transform the musical seed. For instance, the service may access a user account information data store and identify the one or more user accounts for the selected users of the group of users. Subsequently, the service may append each of these accounts with an identifier for the assigned transformation algorithm. Additionally, the service may specify within these user accounts whether the transformation algorithms are to be applied in a particular order. For instance, if the use of transformation algorithms to transform the musical seed is not commutative, each user account may specify an ordering in which these assigned transformation algorithms are to be utilized to achieve the proper transformation solution. Upon updating the user accounts to specify the assigned transformation algorithms for each of the selected users of the group of users, the service may provide 610 the corresponding one or more transformation algorithms to each of the users of the group of users that are to be involved in the authentication/authorization processes.

Figure 7:
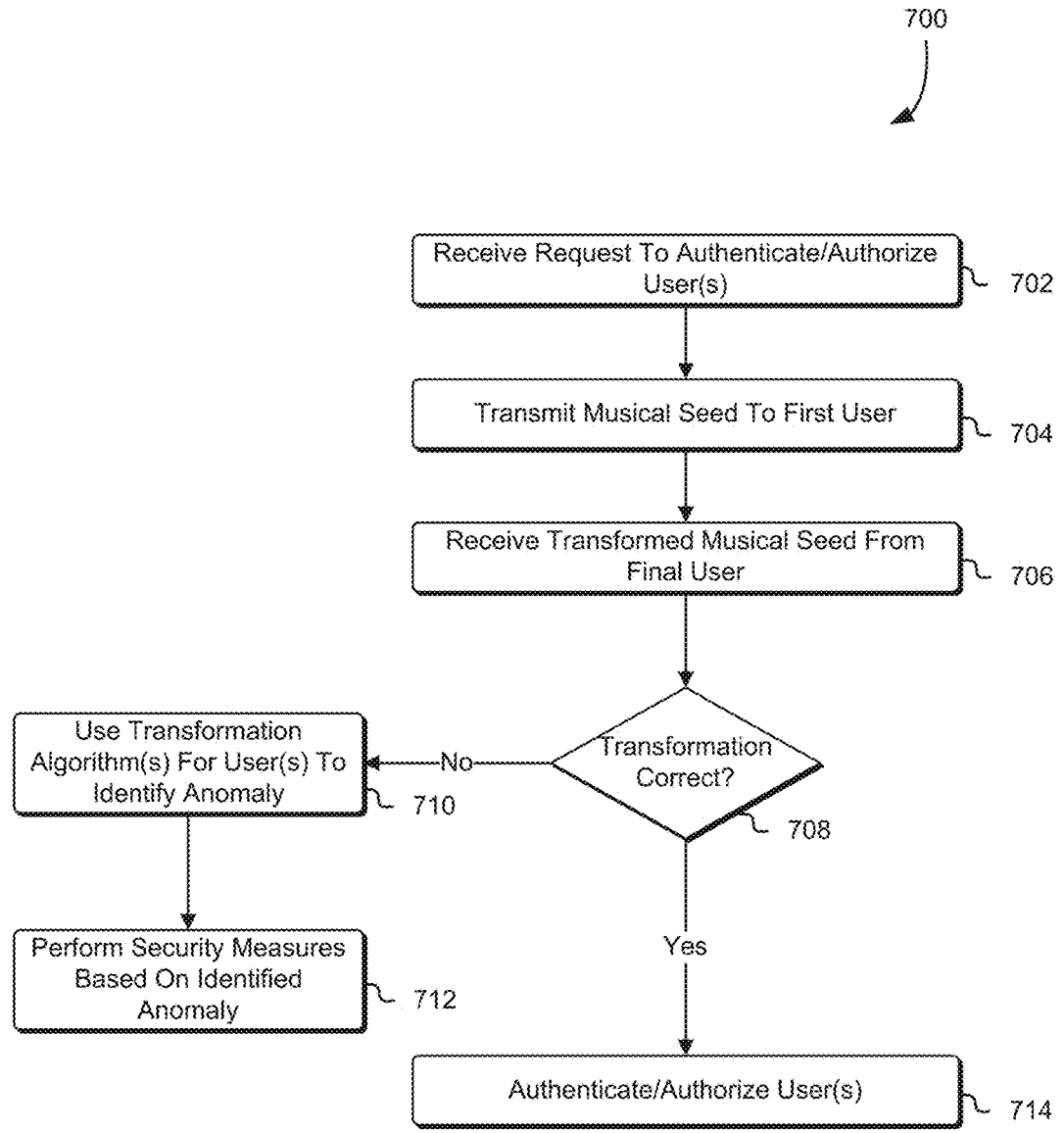
FIG. 7 shows an illustrative example of a process for authenticating/authorizing one or more users of an authentication/authorization chain by analyzing a transformed musical seed in accordance with at least one embodiment.

As noted above, a service may provide a first user of a group of users with a musical seed, which may be transformed by a subset of users of the group of users to enable authentication of the group of users or to provide group authorization to a user of the group to enable the user to perform one or more operations. Each user of this subset of users may utilize a transformation algorithm to transform the musical seed and generate a transformed musical seed which may then be analyzed by the service to determine whether the performed transformations are correct and, thus, enable the group of users to access the service and/or authorize a user of the group of users to perform one or more requested operations. Accordingly, FIG. 7 shows an illustrative example of a process 700 for authenticating/authorizing one or more users of an authentication/authorization chain by analyzing a transformed musical seed in accordance with at least one embodiment. The process 700 may be performed by the aforementioned service, which may be configured to generate or obtain a musical seed usable for transformation by each user of the group of users assigned with a particular transformation algorithm. Additionally, the service may be configured to analyze received transformed musical seeds to determine whether the group of users may be granted access to the service (e.g., authenticated) and/or a user of the group of users is authorized to perform one or more operations on behalf of the group.

In an embodiment, a service receives 702 a request to authenticate a group of one or more users and/or authorize one or more users of the group of one or more users to perform a particular action. For instance, a user of a group of users may utilize an interface provided by the service to access the service and/or request performance of one or more operations on behalf of a group of users. In response to this request, the service may transmit 704 a musical seed to a first user of the group of users to enable authentication of the group of users and/or authorization for the performance of the one or more operations as requested by a user of the group. In some embodiments, the service may access a user account information data store to identify the one or more users of the group of users that are to be involved in the authentication/authorization process. Further, the service may determine an ordering of users to which the musical seed is to be provided for transformation. For instance, if the transformation of the musical seed is commutative (e.g., transformation may be performed in any order), the service may transmit the musical seed to any of the users of the group of users that are to be involved in the authentication/authorization process. However, if the transformation of the musical seed is not commutative, the service may determine the first user of the group of users to whom the musical seed is to be transmitted and provide, in addition to the musical seed, data specifying an ordering of users of the group of users that are to utilize their own transformation algorithms to transform the musical seed.

Figure 8:
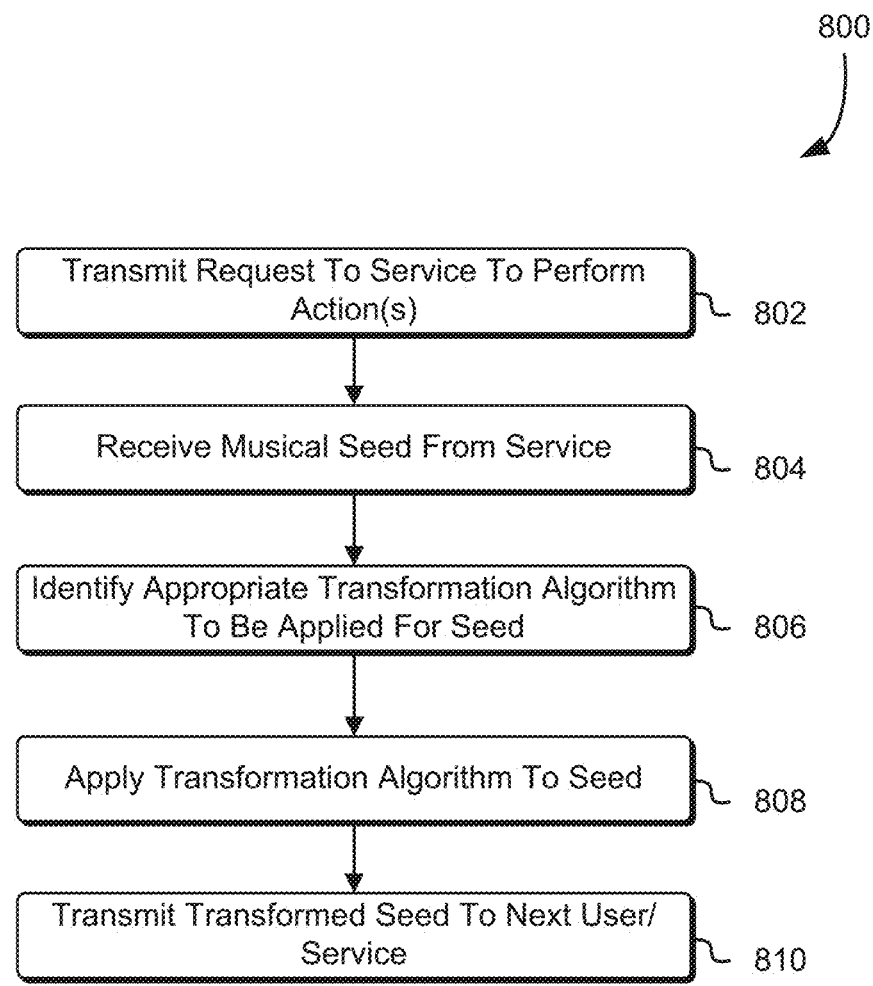
FIG. 8 shows an illustrative example of a process for using a transformation algorithm to transform a musical seed usable for authentication in accordance with at least one embodiment.

As will be described in greater detail below in connection with FIG. 8, this first user may utilize his/her assigned transformation algorithm to transform the musical seed. Further, the first user may identify the next user of the group of users, based at least in part on the metadata or other data file specifying the ordering of the group of users, and transmit this transformed musical seed to this next user of the group. Each subsequent user of the group of users may receive this transformed musical seed and apply his/her transformation algorithm until the final user of the group receives the transformed musical seed. This final user of the group may apply his/her transformation algorithm to the transformed musical seed and transmit this transformed musical seed to the service. Thus, the service may receive 706 the transformed musical seed from this final user of the group of users.

Once the service has received the transformed musical seed from the final user of the group of users, the service may determine 708 whether the transformation of the musical seed is correct. For instance, the service may identify the one or more transformation algorithms assigned to each user of the group of users and apply these one or more transformation algorithms to the original musical seed to obtain a reference audio signal. This reference audio signal may serve as the expected transformation solution for the transformation of the musical seed. Subsequently, the service may compare the received transformed musical seed to this reference audio signal to determine if there is a match. If the transformed musical seeds do not match, then the received transformed musical seed is not correct. In an alternative embodiment, if the original musical seed comprises a garbled sound that, when successfully transformed, results in a recognizable sound or series of sounds (e.g., understandable speech, a recognizable musical composition, etc.), the service can determine whether the transformation is correct based at least in part on whether the received transformed musical seed still comprises a garbled sound or now comprises recognizable sounds.

If the transformation of the musical seed is not correct, the service may utilize 710 the one or more transformation algorithms assigned to each user of the group of users to identify the source of the anomalous transformation. For instance, if the transformation of the musical seed is not commutative, requiring a particular ordering for the transformation to be performed, the service may use the one or more transformation algorithms in one or more differing orders to determine whether the musical seed was transformed in an erroneous manner. Further, the service may be able to discern, from the received transformed musical seed and the assigned transformation algorithms, which user of the group of users did not utilize his/her assigned transformation algorithm to produce the proper authentication/authorization claim.

Once the service has determined the source of the anomaly that has resulted in the incorrect transformation of the musical seed, the service may perform 712 one or more security measures. For instance, the service may notify an administrator of the group of users to the particular anomaly and identify the one or more users of the group of users that may be the cause of the anomaly. This may enable the administrator to address the anomaly internally, through punitive or remedial measures, such as through suspension of the users or any other corrective operations that may prevent further user malfeasance or misfeasance. Alternatively, the service may deny the user's request to access the service and/or perform the specified one or more operations.

If the transformation received from the group of users is correct, the service may authenticate and/or authorize the user to perform the one or more requested operations. For instance, if the service receives a correctly transformed musical seed, the service may determine that the user is hereby authorized, by the group of users, to perform the one or more requested operations within the service. Additionally, or alternatively, by the group of users having provided a correct transformation of the musical seed, the service may be able to authenticate the user, as well as the group of users and enable these users to access the service to request further performance of other operations.

As noted above, a member of a group of users may transmit a request, to a particular service, to access the service and/or perform one or more operations on behalf of this group of users. In response, the service may provide the group of users with a musical seed that may need to be transformed successfully to enable this member of the group to gain access to the service and/or perform the one or more operations. Accordingly, FIG. 8 shows an illustrative example of a process 800 for using a transformation algorithm to transform a musical seed usable for authentication in accordance with at least one embodiment. The process 800 may be performed by any member of a group of users that may submit one or more requests to a service and, further, participate in the authentication/authorization processes for the group of users.

In an embodiment, a member of a group of users transmits 802 a request to a service to access the service and/or perform one or more operations on behalf of the group of users. The service may determine, based at least in part on this request, the identity of the user and the group of users to which he/she is a member. Once the service has identified the group of users to which the user is a member of, the service may identify and/or generate a musical seed that may be used to determine whether the group of users may access the service and/or authorize the member of the group to perform the requested one or more operations. Further, the service may determine an ordering for the transformation of the musical seed and the appropriate solution to the transformation. The service may subsequently transmit the seed to the member of the group of users which may receive 804 this seed for transformation.

Once the user has received the musical seed from the service, the user may identify 806 the appropriate transformation algorithm that is to be applied to the musical seed to generate a transformed musical seed. For instance, if the user is a member of various groups of users, the user may be assigned a transformation algorithm for each group that he/she is a member of. In an embodiment, the musical seed includes, within metadata or in a separate data file, an identifier for the group of users for which the authentication/authorization processes are being performed. The user may utilize this identifier to determine which transformation algorithm is needed to transform the musical seed correctly and provide the transformed musical seed to the next user of the group of users. Thus, once the user has identified the appropriate transformation algorithm, the user may apply 808 the transformation algorithm to the musical seed to generate the authentication/authorization claim.

Based at least in part on the ordering of the one or more users of the group of users, the user may be able to identify the next user that is to utilize his/her transformation algorithm to further modify the musical seed. Alternatively, if the transformation of the musical seed is commutative, the user may select any other user of the group of users to further transform the musical seed for the authentication/authorization processes. Thus, once the user has identified the next user of the group of users, the user may transmit 810 the transformed seed to this next user for further modification. Alternatively, if the user is the only member of the group of users, he/she may provide the transformed seed to the service for verification.

Figure 9:
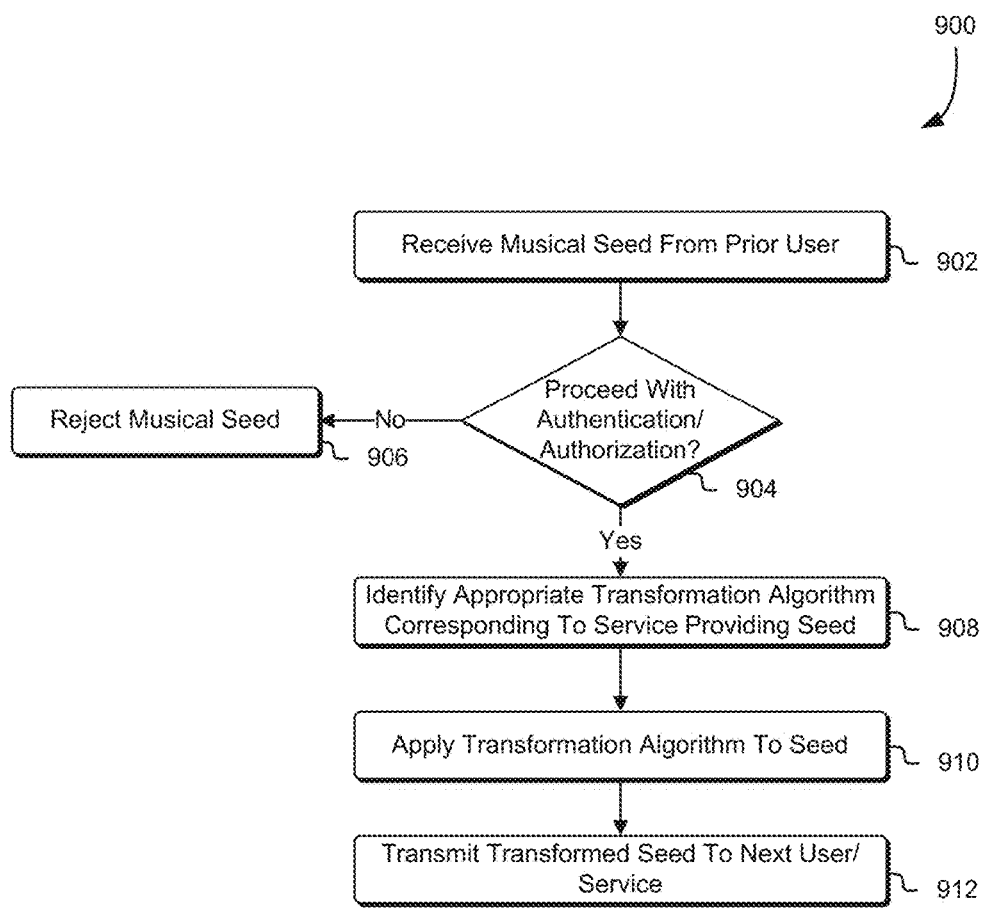
FIG. 9 shows an illustrative example of a process for using a transformation algorithm to transform a transformed musical seed from a prior user in an authentication chain in accordance with at least one embodiment.

As noted above, each user of a group of users involved in an authentication and/or authorization chain may be required to apply his/her unique transformation algorithm to transform a musical seed from a service. Each user, upon applying his/her assigned transformation algorithm to the musical seed may provide the transformed musical seed to a next user of the group or, if the user is the final user of the group, to the service for processing. Accordingly, FIG. 9 shows an illustrative example of a process 900 for using a transformation algorithm to transform a transformed musical seed from a prior user in an authentication chain in accordance with at least one embodiment. The process 900 may be performed by any user of a group of users involved in an authentication/authorization chain for enabling the group of users to access a service and/or enable a user of the group of users to perform one or more operations.

In an embodiment, a service, in response to a request by a user of the group of users to access the service and/or perform one or more operations, transmits a musical seed to a first user of the group of users to perform an authentication/authorization process. Once the first user receives the musical seed from the service, he/she may apply his/her assigned transformation algorithm to generate a transformed musical seed. Further, based at least in part on an ordering of users specified within metadata of the musical seed or in a separate data file from the service, the first user may transmit the transformed musical seed to the next user of the group of users specified within this ordering of users. Thus, a user within the authentication/authorization chain may receive 902, from the first user or any other user in the chain, the transformed musical seed.

Once the user receives the transformed musical seed, the user may determine 904 whether he/she wants to proceed with this authentication/authorization process. For instance, the user may decide, based at least in part on information provided with the musical seed, that he/she does not want to authorize or enable authentication of the particular user to enable the one or more operations to be performed. In such instances, the user may reject 906 the musical seed and terminate the authentication/authorization process, resulting in the service denying the requesting user's request to perform the one or more operations. In an embodiment, the musical seed is received from a retailer, whereby the user may be required to perform apply an appropriate transformation in order to authorize the retailer to transmit promotional communications to the user. In such an embodiment, the user may not want to receive promotional communications and thus may reject 906 the musical seed.

If the user within the chain has received the transformed musical seed from the prior user within the chain and has determined that the authentication/authorization process may continue, the user may identify 908 the appropriate transformation algorithm to be applied corresponding to the service that has provided the original musical seed. For instance, the user may be a member of various groups of users, each group involved in authentication/authorization chains for various services. Thus, the user may be required to determine, based at least in part on the metadata of the musical seed and/or the separate data file specifying the ordering of the group of users, to which service and corresponding group of users the authentication/authorization processes are to be performed. This may enable the user to select the correct transformation algorithm and apply 910 the transformation algorithm to the transformed musical seed.

Based at least in part on the user's position within the ordering of the group of users, the user may either transmit 912 the transformed musical seed to the next user or to the service for analysis. For instance, the user may evaluate the metadata of the musical seed and/or the separate data file specifying the ordering of the group of users to identify the next user that is to be provided the transformed musical seed for further transformation. Alternatively, if the user determines, based at least in part on the metadata and/or the separate data file that he/she is the final user in the authentication/authorization chain, the user may transmit the transformed musical seed to the service, as no more transformation may be required from other users.

Figure 10:
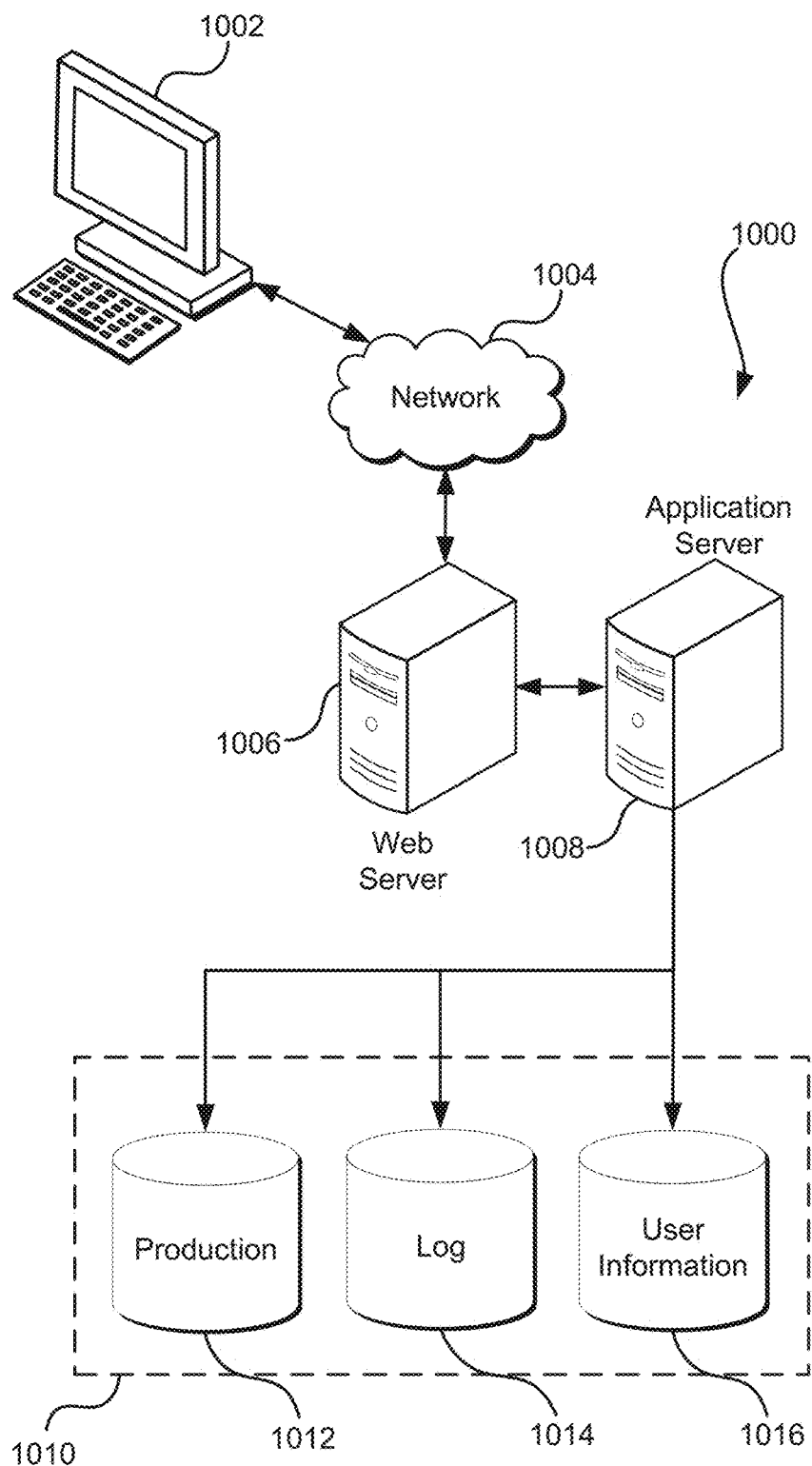
FIG. 10 shows an illustrative example of an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   receiving an authentication claim comprising a media encoding;
   determining a set of image transformation algorithms for a media seed, the set of image transformation algorithms comprising a first image transformation algorithm associated with a first entity and a second image transformation algorithm associated with a second entity, wherein the first image transformation algorithm:
     is different from the second image transformation algorithm; and
     produces a visibly perceptible transformation of media;
   applying the set of image transformation algorithms to the media seed to generate a reference media file; and
   authorizing performance of an operation as a result of determining that the reference media file matches the media encoding of the authentication claim.

2. The computer-implemented method of claim 1, wherein the media seed is provided in response to having received a request to perform the operation.

3. The computer-implemented method of claim 1, wherein at least one of the first image transformation algorithm or the second image transformation algorithm includes a modification of a color hue of the media seed.

4. The computer-implemented method of claim 1, wherein at least one of the first image transformation algorithm or the second image transformation algorithm includes removal of an element of the media seed.

5. The computer-implemented method of claim 1, wherein at least one of the first image transformation algorithm or the second image transformation algorithm includes insertion of a watermark into the media seed.

6. The computer-implemented method of claim 1, wherein at least one of the first image transformation algorithm and the second image transformation algorithm includes supplementing the media seed with an image design.

7. The computer-implemented method of claim 1, wherein determining that the reference media file matches the media encoding occurs as a result of applying the set of image transformation algorithms in a particular order.

8. A system, comprising:
   one or more processors; and
   memory including instructions that, as a result of being executed by the one or more processors, cause the system to:
     provide a media seed and an ordering of a group of users, the group of users comprising a first user assigned with a first image transformation algorithm and a second user assigned with a second image transformation algorithm, wherein the first image transformation algorithm:
       is different from the second image transformation algorithm; and
       produces a visibly perceptible transformation of media;
     receive an authentication claim comprising a media encoding;
     determine, based at least in part on the ordering of the group of users, an ordered set of image transformation algorithms that include the first image transformation algorithm and the second image transformation algorithm;
     apply the ordered set of image transformation algorithms to the media seed to generate a reference media file; and
     authorize an entity associated with the authentication claim to perform an operation as a result of determining that the reference media file matches the media encoding.

9. The system of claim 8, wherein the instructions further cause the system to store the authentication claim in an audit record in response to determining that the reference media file matches the media encoding.

10. The system of claim 8, wherein at least one of the first image transformation algorithm or the second image transformation algorithm includes supplementing the media seed with an image object.

11. The system of claim 8, wherein at least one of the first image transformation algorithm and the second image transformation algorithm includes modifying an image saturation of the media seed.

12. The system of claim 8, wherein at least one of the first image transformation algorithm or the second image transformation algorithm includes removal of an element of the media seed.

13. The system of claim 8, wherein at least one of the first image transformation algorithm or the second image transformation includes insertion of a watermark into the media seed.

14. A non-transitory computer-readable storage medium having stored thereon executable instructions that, as a result of being executed by one or more processors of a computer system, cause the computer system to at least:
   receive an authentication claim for a group of entities comprising a first entity assigned with a first image transformation algorithm and a second user assigned with a second image transformation algorithm, wherein the first image transformation algorithm:
     is different from the second image transformation algorithm; and
     produces a visibly perceptible transformation of media;
   determine, based at least in part on the group of entities, the first image transformation algorithm, and the second image transformation algorithm, a set of image transformation algorithms;
   validate the authentication claim based at least in part on the set of image transformation algorithms, an encoding of media, and the received authentication claim; and
   as a result of successful validation of the authentication claim, authorize an entity of the group of entities to perform an operation.

15. The non-transitory computer-readable storage medium of claim 14, wherein:
   the instructions further cause the computer system to provide a seed comprising encoded media and an ordering of the group of entities; and the authentication claim is received in response to the seed having been provided.

16. The non-transitory computer-readable storage medium of claim 15, wherein the instructions further cause the computer system to:
- determine, based at least in part on the ordering of the group of entities, an ordering of the set of image transformation algorithms for applying the first image transformation algorithm and the second image transformation algorithm, resulting in an ordered set of image transformation algorithms; and
- apply the ordered set of image transformation algorithms to the seed to validate the authentication claim.

17. The non-transitory computer-readable storage medium of claim 14, wherein at least one of the first image transformation algorithm or the second image transformation algorithm includes modifying an image saturation of the encoding of media.

18. The non-transitory computer-readable storage medium of claim 14, wherein at least one of the first image transformation algorithm or the second image transformation algorithm includes removal of an element of the encoding of media.

19. The non-transitory computer-readable storage medium of claim 14, wherein at least one of the first image transformation algorithm or the second image transformation algorithm includes a modification of a color hue of the encoding of media.

20. The non-transitory computer-readable storage medium of claim 14, wherein at least one of the first image transformation algorithm or the second image transformation algorithm includes supplementing the encoding of media with an image object.

21. The non-transitory computer-readable storage medium of claim 14, wherein at least one of the first image transformation algorithm or the second image transformation algorithm includes insertion of a watermark into the encoding of media.

* * * * *